United States Patent
Chen (10) Patent No.: US 6,493,486 B1
(45) Date of Patent: Dec. 10, 2002

(54) THERMAL COMPENSATED COMPACT BRAGG GRATING FILTER

(75) Inventor: Peter Chen, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 09/507,119

(22) Filed: Feb. 17, 2000

(51) Int. Cl.[7] ................................................. G02B 6/34
(52) U.S. Cl. ......................................................... 385/37
(58) Field of Search ............................. 385/37, 99, 137

(56) References Cited

U.S. PATENT DOCUMENTS

| | | | |
|---|---|---|---|
| 5,042,898 A | | 8/1991 | Morey et al. ................... 385/37 |
| 5,367,588 A | | 11/1994 | Hill et al. ...................... 385/37 |
| 5,721,802 A | * | 2/1998 | Francis et al. ............... 385/137 |
| 5,841,920 A | | 11/1998 | Lemaire et al. ................ 385/37 |
| 6,044,189 A | * | 3/2000 | Miller ........................... 385/37 |
| 6,055,348 A | * | 4/2000 | Jin et al. ....................... 385/37 |
| 6,108,470 A | * | 8/2000 | Jin et al. ....................... 385/37 |

FOREIGN PATENT DOCUMENTS

JP    2000-292620 A    * 10/2000

OTHER PUBLICATIONS

Lin et al., Corrugated Long–Period Fiber Gratings as Strain, Torsion, and Bending Sensors. Journal of Lightwave Technology, vol. 19 No. 8, pp. 1159–1168. Aug. 2001.*

Zhang et al., Linear Fibre–Grating Type Sensing Tuned by Applying Torsion Stress. Electronics Letters, vol. 36 No. 20, pp. 1686–1688. Sep. 2000.*

Tsai et al., Central Wavelength Tunable Mechanism for Temperature Compensated Package of Fiber Brag Gratings. IEEE Transactions on Advanced Packaging, vol. 24 No. 1, pp. 86–90. Feb. 2001.*

* cited by examiner

Primary Examiner—John D. Lee
Assistant Examiner—Michael J. Stahl
(74) Attorney, Agent, or Firm—Fish & Richardson, P.C.

(57) ABSTRACT

Various aspects of thermal compensated Bragg grating filters are disclosed. In one disclosed aspect, an optical fiber having a Bragg grating therein is laid adjacent to a torsion member, and the two are then rigidly affixed between a torsion adjusting member and a compensating member. The torsion adjusting member may then be rotated, twisting the optical fiber around the torsion member, and thus applying torsion to the optical fiber containing the Bragg grating, and changing the period of the Bragg grating. A further disclosed aspect provides an optical fiber, containing a Bragg grating filter therein, which is rigidly affixed between a torsion adjusting member and a compensating member in an axis other than the compensating member's longitudinal axis. The torsion adjusting member may then be rotated to apply torsion to the optical fiber, and change the period of the Bragg grating. Another disclosed aspect comprises an optical fiber, containing a Bragg grating filter therein, and a compensating member having a desired thermal coefficient of expansion. The optical fiber is bent through a curve and affixed to the compensating member such that torsion is applied to the Bragg grating region of the optical fiber.

15 Claims, 6 Drawing Sheets

Fig. 1

(Prior Art)

THERMAL COMPENSATED COMPACT BRAGG GRATING FILTER

BACKGROUND OF THE INVENTION

1. Field of the Invention

The present invention relates to optical fiber filters, and particularly to improved fiber Bragg grating filters.

2. The Prior Art

Fiber Bragg grating filters are known in the art. Fiber Bragg grating filters are becoming widely used because of the increased use of fiber optical systems. For example, fiber Bragg grating filters are used to filter out noise or unwanted wavelengths of light in optical distribution systems.

Figure 1:
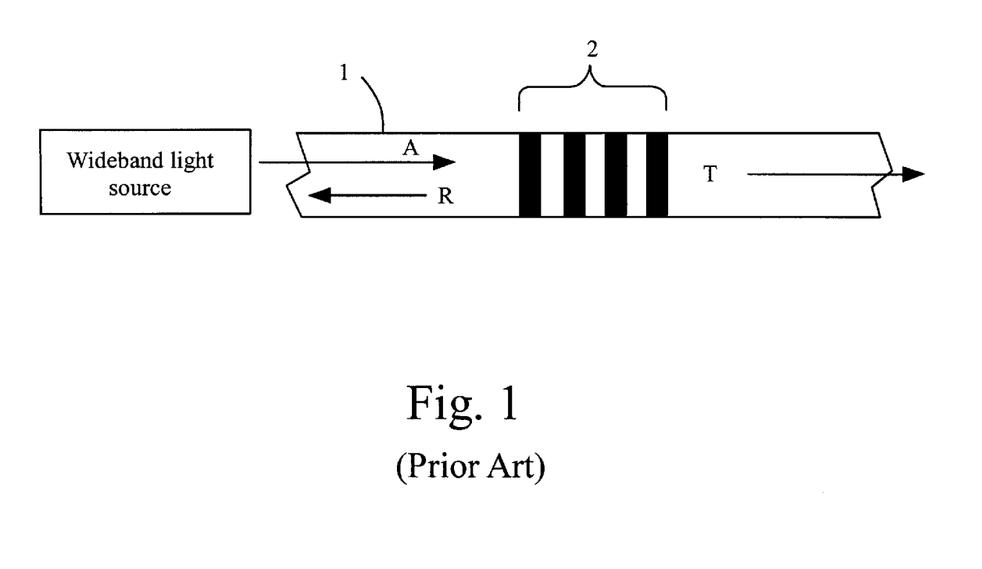
FIG. 1 is a diagram of a prior-art thermal-compensated Bragg grating filter example.

FIG. 1 is a diagram showing the operation and measurement of a prior-art fiber Bragg grating filter. FIG. 1 shows an optical fiber 1 incorporating a Bragg grating portion 2. As is known by those of ordinary skill in the art, Bragg grating portion 2 is formed by applying energy such as laser energy to an optical fiber. The resulting deformations in the optical fiber increases the refractive index of the fiber periodically as shown in FIG. 1.

The effects of fiber Bragg grating filters on applied light is demonstrated in FIG. 1 by applying the output A of a wide bandwidth light source to optical fiber 1. When the applied light A encounters the Bragg grating portion 2, some light will pass through the Bragg grating portion 2 and be transmitted as light T, and some of the applied light A will be reflected by the Bragg grating portion 2 and will travel back to the source as light R.

Figure 2:
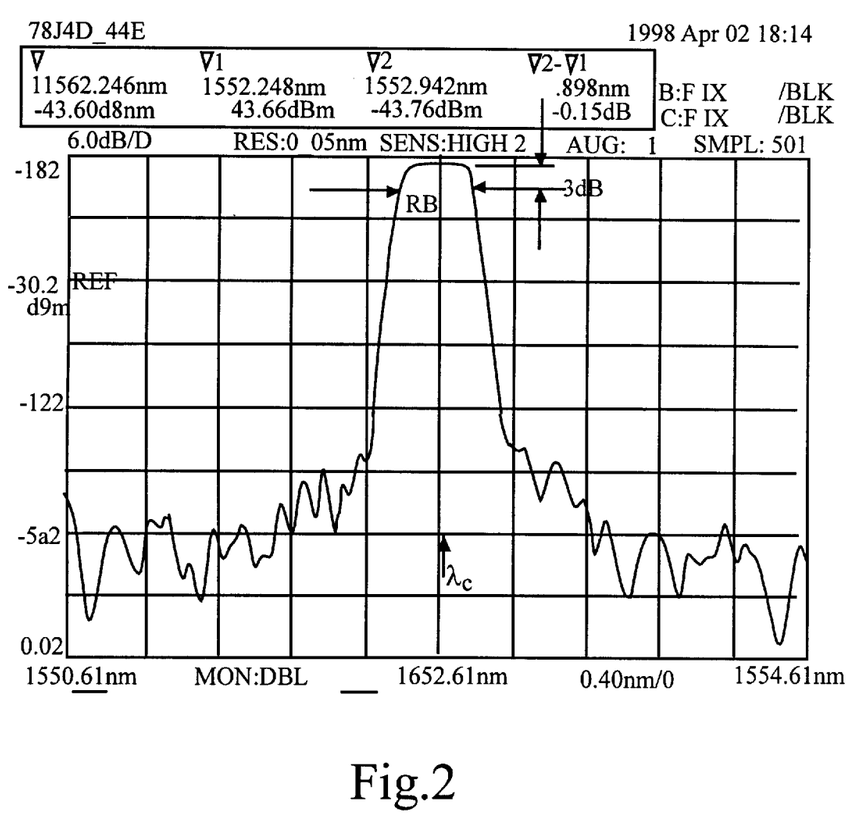
FIG. 2 is diagram of a prior-art thermal-compensated Bragg grating filter response curve.

Typically, fiber Bragg grating filters are designed to pass or reflect a desired wavelength, or band of wavelengths, of light. FIG. 2 is a graph typical of such a design. FIG. 2 shows a graph where the vertical axis represents the percentage of reflected light R reflected back to the source, as was shown in FIG. 1 by reflected light R. The horizontal axis represents the wavelength of light, and is scaled in nanometers (nm). As can be seen from FIG. 2, a typical fiber Bragg grating filter will form a band-reject filter, rejecting a predetermined band of light having a central wavelength of $\lambda_c$. One example of a prior art fiber Bragg grating filter is designed to have a $\lambda_c$ in the range of 1,500 nm to 1,650 nm. Fiber Bragg grating filters may also be defined to have a reject band, shown as RB in FIG. 2. Reject band RB is defined as the range where the response of the fiber Bragg grating filter is greater than 3 dB. As is known by those of ordinary skill in the art, the inverse of the plot shown in FIG. 2 will show the transmitted light T rather than the reflected light R, and the inverse of the region defined as the reject band RB will be shown as the pass band.

As mentioned above, often fiber Bragg grating filters are utilized in optical distribution systems and thus may be deployed in any number of locations, such as buried underground. Therefore, fiber Bragg grating filters must be able to function in a wide variety of hostile environments, such as drastic seasonal temperature fluctuations. One problem associated with prior-art fiber Bragg grating filters is their sensitivity to environmental temperature fluctuations. The materials that fiber Bragg grating filters are constructed from tend to expand or contract depending upon the ambient temperature. For example, as temperature increases, the refractive index of the fiber increases due to the positive temperature dependence of the refractive index of the fiber, which is approximately $5.6 \times 10^{-6}$/° C. The temperature coefficient of the central wavelength of pass-band is about 0.01 nm/° C. Thus, $\lambda_c$ as shown in FIG. 2 will tend to shift with the ambient temperature.

However, the refractive index of the fiber is proportionately dependent on its internal stress. Thus, relieving tension on the fiber as temperature increases can decrease the refractive index to compensate for the temperature induced wavelength shift of all Bragg grating filters. Tension can be released as temperature increases by thermal expansion of a substrate having a negative thermal expansion coefficient to which the fiber is attached, or by thermal induced bending of a bi-metal plate. The prior art has successfully used this technique to provide thermal-compensated fiber Bragg grating filters.

For example, in U.S. Pat. No. 5,042,898 to Morey et al., a portion of a length of an optical fiber incorporating a grating filter is fixedly mounted between two compensating members formed from a material having selected thermal expansion coefficients. The first compensating member is preferably fabricated from a material having a high thermal expansion coefficient. The second compensating member may be formed from a material having a low thermal expansion coefficient, as for example Invar or Fused silica. The positions of the two compensating members are then adjusted with respect to one another such that the fiber portion incorporating the grating filter may be placed under a preloaded tensile stress condition.

During the subsequent use of the device following the tension preloading of the fiber portion containing the Bragg filter grating region, the effect of differential thermal expansion coefficients between the materials of the compensating members decreases the tension applied to the fiber portion with a temperature increase and increases the tension applied to the fiber portion on a temperature decrease, thus compensating for the wavelength change of the filter with the changing temperature. The rate of relieving tension can be selected by choosing materials with appropriate thermal expansion coefficients for the compensating members and by adjusting the geometry in order to hold the wavelength of the Bragg filter constant. In one disclosed embodiment, the material of one of the compensating members has a larger thermal coefficient of expansion than the material of the other compensating member. As a consequence, the tensile stress of the fiber portion containing the filter or grating region will be decreased as temperature increases and increased as temperature decreases.

Another prior-art thermal-compensated Bragg grating filter employs a portion of a length of an optical fiber incorporating a grating filter rigidly connected in tension between the ends of a c-shaped frame formed from a first material. The c-shaped frame is mounted at its center portion to a strip of a second material having a thermal coefficient of expansion different from that of the first material to form a bimetallic strip. The bi-metallic strip bends with temperature change as is known in the art, thus deforming the center section of the c-shaped frame comprising one of its elements and changing the tension exerted on the portion of the optical fiber incorporating a grating filter disposed between the two ends of the frame.

Yet another prior-art thermal-compensated Bragg grating filter is disclosed in U.S. Pat. No. 5,841,920 and employs an optical fiber incorporating a Bragg grating filter in which the central wavelength varies in opposite directions with temperature and with an axial strain applied to the grating. A top surface of a compensating member is affixed to a portion of the fiber that includes the grating and a tension adjusting member is connected to the compensating member. The tension adjusting member and the compensating member are formed of materials selected so that as the temperature of the device decreases, the tension adjusting member contracts more than the compensating member so as to control the deformation of the compensating member and thereby impose an axial strain on the grating. The controlled application of tensile stress to the optical fiber in the region of the grating causes changes in the central wavelength of the pass band of the filter to compensate for central wavelength variations resulting from changes in the grating temperature.

The prior-art thermal compensated Bragg grating filters are suitable for their intended purpose. However, they all have one or more certain drawbacks, including long lengths or other dimensions. Further, the prior-art thermal compensated Bragg grating filters are relatively complex and expensive to manufacture. Furthermore, prior art devices that apply axial tension to the optical fiber tend to have a high failure rate due to the fact that over time the applied tension will cause failures in the optical fiber or the means used to attached the optical fiber.

It is therefore an object of the present invention to provide a thermal-compensated Bragg grating filter that overcomes the problems of the prior art.

It is another object of the present invention to provide a thermal-compensated Bragg grating filter that is easier and less expensive to manufacture than those of the prior art.

Yet another object of the present invention to provide a thermal-compensated Bragg grating filter that is smaller in size than those of the prior art.

Yet another object of the present invention to provide a thermal-compensated Bragg grating filter that is more reliable than those of the prior art.

BRIEF DESCRIPTION OF THE INVENTION

According to first aspect of the invention, a thermal compensated Bragg grating filter comprises a compensating member and a torsion adjusting member rotatedly mounted to the compensating member. An optical fiber having a Bragg grating therein is laid adjacent to a torsion member, and the two are then rigidly affixed between the torsion adjusting member and the compensating member. The torsion adjusting member may then be rotated, twisting the optical fiber around the torsion member, and thus applying torsion to the optical fiber containing the Bragg grating.

According to a second aspect of the invention, a thermal compensated Bragg grating filter comprises a compensating member having a longitudinal axis and a torsion adjusting member rotatedly mounted to the compensating member. An optical fiber containing a Bragg grating filter therein is rigidly affixed between the torsion adjusting member and the compensating member in an axis other than the compensating member's longitudinal axis. The torsion adjusting member may then be rotated to apply torsion to the optical fiber.

According to a third aspect of the invention, a thermal compensated Bragg grating filter comprises an optical fiber containing a Bragg grating filter therein and a compensating member having a desired thermal coefficient of expansion. The optical fiber is bent through a curve and affixed to the compensating member such that torsion is applied to the Bragg grating region of the optical fiber.

Other aspects of the invention provide for bending the optical fiber through a curve, for twisting the optical fiber, and for twisting the optical fiber around another member, and then affixing the optical fiber to a compensating member having a selected thermal coefficient of expansion.

The present invention provides an arrangement constructed from one component for introducing in an optical fiber a strain that compensates for temperature induced changes in wavelength reflected by grating. The thermal-compensated Bragg grating filter of the present invention has fewer parts than and is simpler and less expensive to manufacture than prior-art thermal-compensated Bragg grating filters. The thermal-compensated Bragg grating filter of the present invention is also smaller in length than prior-art thermal- compensated Bragg grating filters. The thermal compensated Bragg grating filter of the present invention also has substantially more thermal linearity than those of the prior art, and is more reliable.

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

Figure 3:
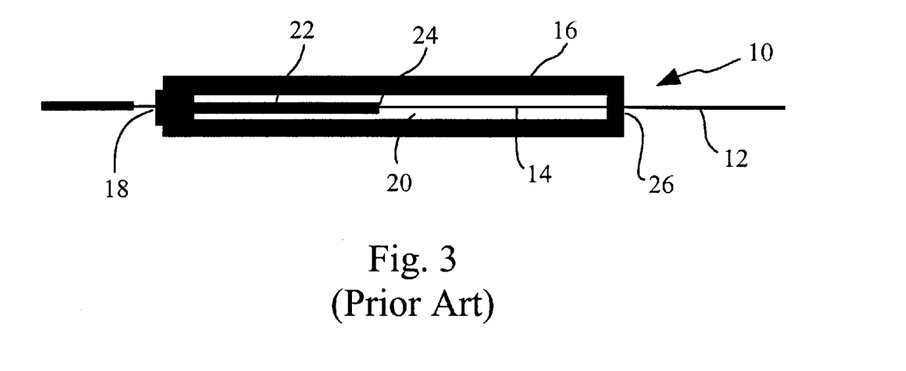
FIG. 3 is a diagram of a first prior-art thermal-compensated Bragg grating filter.

Referring first to FIG. 3, a first prior-art thermal-compensated Bragg grating filter 10 is shown. An optical fiber 12 incorporating a grating region 14 as is known in the art is mounted between a first compensating member 16, formed from a material such as Invar or quartz, and a second compensating member 18 formed from a material such as aluminum or steel having a thermal expansion coefficient different from that of the first compensating member. The first compensating member 16 includes a central recess 20 and the compensating member 18 includes a central projection 22 partially extending into the recess 20. The optical fiber 12 is connected at the respective ends of the Bragg grating region 14 to the first compensating member 16 and to the projection 22 of the second compensating member 20, respectively, by respective connecting members 24 and 26. The connecting members 24 and 26 may be mechanical, such as clamps, or may comprise adhesive, solder, or the like. The first and second compensating members may be connected together by a mechanism, such as threaded screws, to allow selective biasing of the tension of the fiber.

Figure 4:
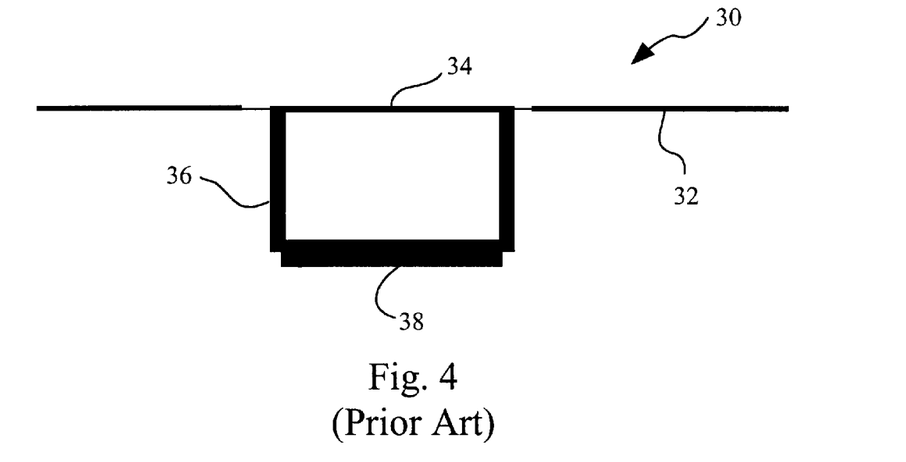
FIG. 4 is diagram of a second prior-art thermal-compensated Bragg grating filter.

Referring now to FIG. 4, a second prior-art thermal-compensated Bragg grating filter 30 is shown. An optical fiber 32 incorporating a grating region 34 as is known in the art is mounted between the ends of a c-shaped frame 36. The center leg of the frame 36 is bonded to a bar 38 formed from a material having a thermal expansion coefficient different from that of the frame 36. The center leg of frame 36 and bar 38 together form a bimetallic strip. Temperature changes cause the bimetallic strip to bend, changing the distance between the endpoints of the c-shaped member, thus altering the tension on the grating region 34 of fiber 32 to compensate for temperature induced changes in the refractive index of the fiber.

Figure 5:
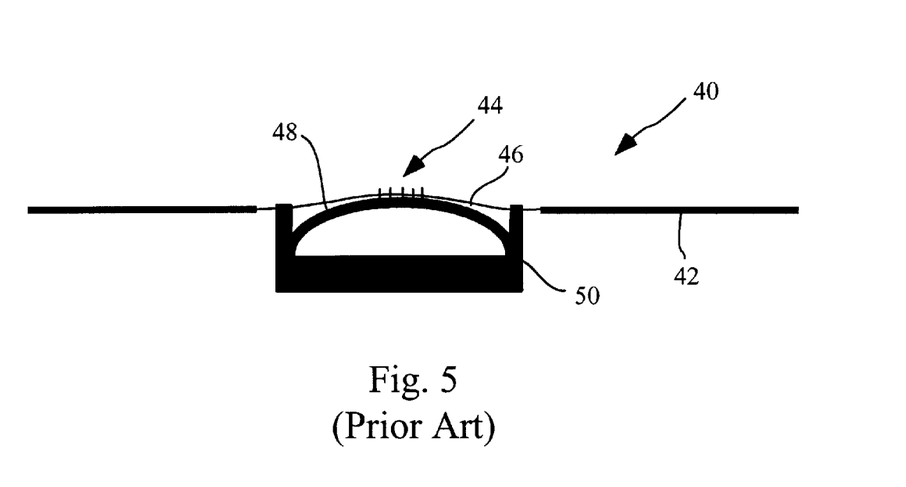
FIG. 5 is diagram of a third prior-art thermal-compensated Bragg grating filter.

Referring now to FIG. 5, a third prior-art thermal-compensated Bragg grating filter 40 is shown. An optical fiber 42 in which a Bragg grating 44 is formed is affixed to a top surface 46 of a compensating member 48. A tension adjusting member 50 is connected to the compensating member 48. The tension adjusting member 50 and the compensating member 48 are formed of materials selected so that as the temperature of the device decreases, the tension adjusting member 50 contracts more than the compensating member 48 so as to control the deformation of the compensating member 48 and thereby impose an axial strain on the grating 44. The controlled application of tensile stress to the optical fiber 42 in the region of the grating 44 causes changes in the central wavelength of the passband of the filter to compensate for central wavelength variations resulting from changes in the grating temperature.

Figure 6:
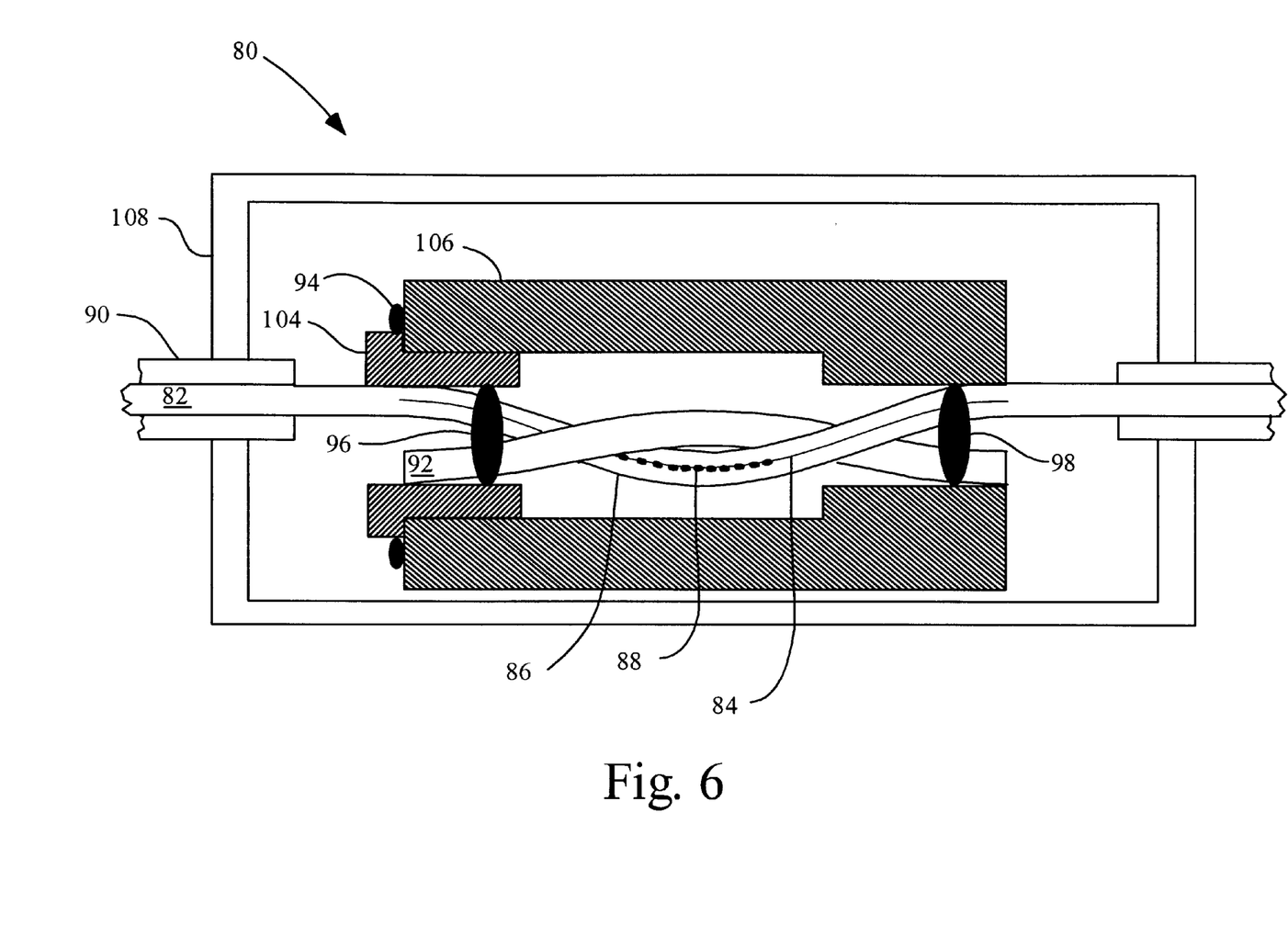
FIG. 6 is a diagram of a first thermal-compensated Bragg grating filter according to the present invention.

Referring now to FIG. 6, a cross-sectional diagram of an embodiment of a thermal-compensated Bragg grating filter 80 according to the present invention is shown. The cross section is taken through the substrate in the region of the optical fiber.

Thermal-compensated Bragg grating filter 80 comprises a optical fiber 82, which further includes an plastic coating 90, a cladded portion 86, and a fiber 84. Optical fiber 82 further includes a Bragg grating portion 88 formed by methods known in the art and obtained from a source such as Corning.

Thermal-compensated Bragg grating filter 80 further includes a torsion member 92. Torsion member 92 provides a means for applying axial torsion on optical fiber 82. In an exemplary non-limiting example, torsion member 92 comprises an optical fiber as shown in FIG. 6. However, any means for applying torsion to optical fiber 82 may be employed in the present invention. For example, in a non-limiting exemplary embodiment a plurality of optical fibers has been used, wherein as many as ten optical fibers comprised the torsion member 92. Furthermore, it is contemplated that varying diameter optical fibers may be used to form torsion member 92. Also, it is contemplated that non-optical fiber means, such as metallic wires, may be used to form torsion member 92, and such non-optical means may be chosen according to desired thermal expansion coefficient or a desired diameter may be used.

Optical fiber 82 and torsion member 92 are laid adjacent to each other and affixed to a compensating member 106 at attachment point 98. As can be seen by inspection of FIG. 6, the plastic coatings of optical fiber 82 and torsion member 92 have been removed to facilitate attachment to compensating member 106. In a preferred embodiment of the present invention, optical fiber 82 and torsion member 92 are wound tightly together such that there is no space between the two. In another preferred embodiment of the present invention, torsion member 92 comprises an optical fiber, and torsion member 92 and optical fiber 82 are fused and twisted together.

Compensating member 106 is formed from a material having a desired thermal expansion coefficient. Suitable materials include Invar or quartz. In an exemplary non-limiting embodiment, compensating member 106 is formed from Invar and has a length approximately 30% greater than the Bragg grating portion 88. In a preferred embodiment, compensating member 106 has a length of approximately 20 mm and is cylindrical in shape along a longitudinal axis.

Thermal-compensated Bragg grating filter 80 further includes a torsion adjusting member 104. Torsion adjusting member 104 is formed from a material having a desired coefficient of expansion. In a preferred embodiment of the present invention, torsion adjusting member 104 is formed from a high thermal expansion material, including aluminum or steel. In an exemplary non-limiting embodiment, torsion adjusting member 104 is formed from aluminum, has a length of approximately 10 mm, and is cylindrical in shape.

Optical fiber 82 and torsion member 92 are affixed to the inner surface of torsion adjusting member 104 at attachment points 96. In an exemplary non-limiting example, the distance between attachment points 96 and 98 is a distance comprising the distance of Bragg grating portion 88 plus a distance suitable to accomplish the attachment of optical fiber 82 and torsion member 92. In an exemplary non-limiting embodiment, torsion adjusting member 104 is sized to fit within a bore formed in one end of compensating member 106. Torsion adjusting member 104 is then rotated until a desired amount of torsion is placed upon optical fiber 82. Then, torsion adjusting member 104 is affixed to compensating member 106 by adhesive means at point 94. In an exemplary non-limiting embodiment, non-permanent adhesive means such as solder are utilized, so that the solder may be re-heated and the torsion may re-adjusted if necessary. However, any permanent or non-permanent affixing means known in the art may be utilized in the present invention.

As will be appreciated by those of ordinary skill in the art, as torsion adjusting member 104 is rotated, optical fiber 82 is twisted about torsion member 92, thus applying a predetermined amount of torsion to optical fiber 82. By applying more torsion to optical fiber 82, the period of Bragg grating portion 88 will be increased. Also, the refractive index of Bragg grating portion 88 will be increased.

In an exemplary non-limiting embodiment of the present invention, optical fiber 82 and torsion member 92 are twisted together at a pitch of approximately 1 mm when measured in the Bragg grating portion 88. It is contemplated that optical fiber 82 and torsion member 92 may twisted together at a pitch ranging from 0.5 mm to 20 mm. Furthermore, the amount of torsion placed upon Bragg grating portion 88 may be controlled by how far apart optical fiber 82 and torsion member 92 are prior to twisting. At attachment points 96 and 98, there may be some distance between optical fiber 82 and torsion member 92. The greater the distance between optical fiber 82 and torsion member 92, the greater the torsional, or flexural, force that may be applied to Bragg grating portion 88. In preferred embodiments of the present invention, optical fiber 82 and torsion member 92 have been placed as far apart as 10 mm.

Thermal-compensated Bragg grating filter 80 may also include an enclosure 108. Enclosure 108 may be added to provide protection against environmental elements. Enclosure 108 is preferably formed from a rugged material such as aluminum or plastic and is affixed at each end about optical fiber 82. In a preferred embodiment, thermal-compensated Bragg grating filter 80 is hermetically sealed within enclosure 108 to provide complete protection against moisture such as dew, rain and snow. In another preferred embodiment, enclosure 108 is affixed at each end about optical fiber 82 in a manner suitable to provide a strain relief for optical fiber 82, thus further increasing the reliability of the present invention.

As will be appreciated by those of ordinary skill in the art, the embodiment disclosed in FIG. 6 has several advantages over prior art devices. For example, as was mentioned in the prior art section above, typical thermal-compensated Bragg grating filters currently on the market suffer from a thermally-induced $\lambda_c$ variation of approximately 0.01 nm/° C. The thermal-compensated Bragg grating filter of the present invention has a linearity of better than 0.0005 nm/° C. As will be appreciated by those of ordinary skill in the art, this is a significant improvement in thermal linearity.

Furthermore, the use of axial torsion, rather than axial tension, to facilitate thermal compensation greatly increases the reliability of the present invention over those of the prior art by eliminating tension-induced failures.

Figure 7:
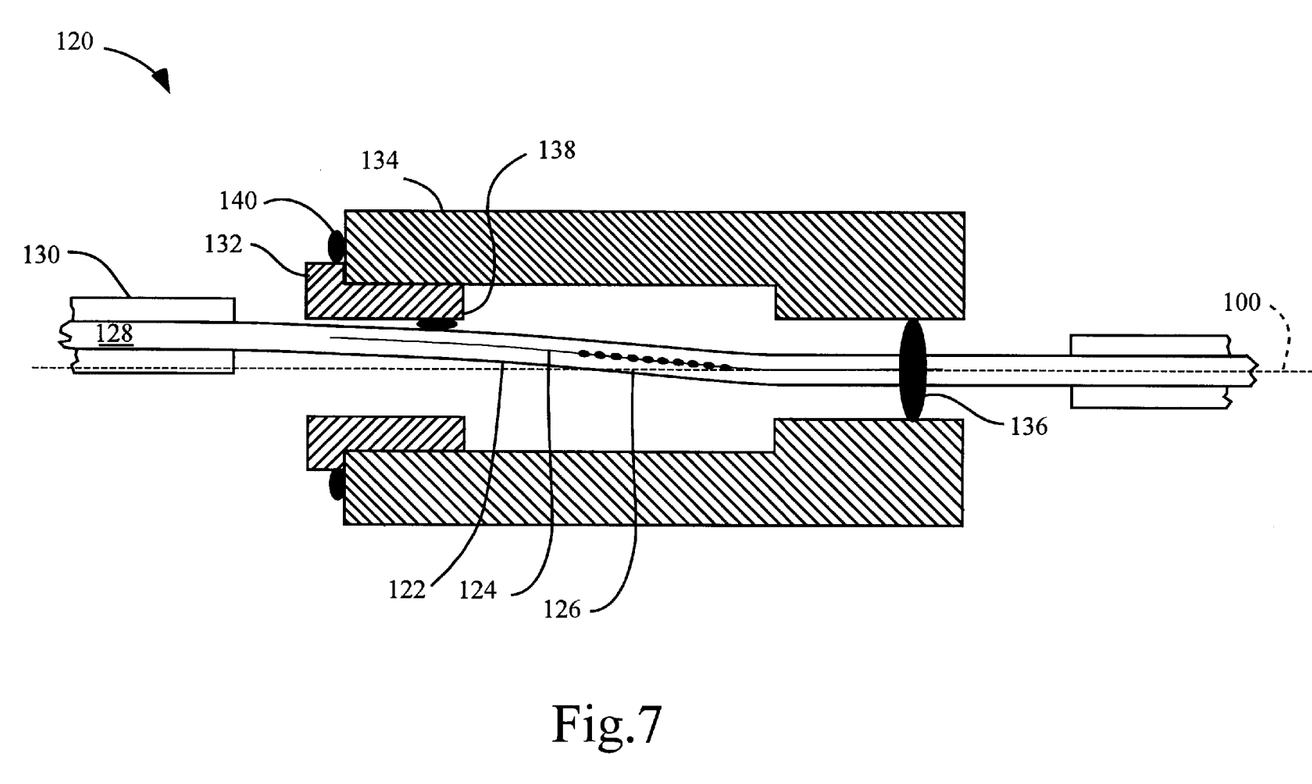
FIG. 7 is a diagram of a second thermal-compensated Bragg grating filter according to the present invention.

Referring now to FIG. 7, a cross-sectional diagram of an embodiment of a thermal compensated Bragg grating filter 120 according to the present invention is shown. The cross section is taken through the substrate in the region of the optical fiber.

Thermal-compensated Bragg grating filter 120 comprises a optical fiber 128, which further includes an plastic coating 130, a cladded portion 122, and a fiber 124. Optical fiber 128 further includes a Bragg grating portion 126 formed by methods known in the art.

Optical fiber 128 is affixed to a compensating member 134 at attachment point 136. As can be seen by inspection of FIG. 7, the plastic coating of optical fiber 128 has been removed to facilitate attachment to compensating member 134.

Compensating member 134 is formed from a material having a desired thermal expansion coefficient. Suitable materials include Invar or quartz. In an exemplary non-limiting embodiment, compensating member 134 is formed from Invar and has a length approximately 30% greater than the Bragg grating portion 126. In a preferred embodiment, compensating member 134 has a length of approximately 20 mm and is cylindrical in shape about an axis 100.

Thermal-compensated Bragg grating filter 120 further includes a torsion adjusting member 132. Torsion adjusting member 132 is formed from a material having a desired coefficient of expansion. In a preferred embodiment of the present invention, torsion adjusting member 132 is formed from a high thermal expansion material, including aluminum or steel. In an exemplary non-limiting embodiment, torsion adjusting member 132 is formed from aluminum, has a length of approximately 10 mm, and is cylindrical in shape.

Optical fiber 128 is affixed to the inner surface of torsion adjusting member 132 at attachment point 138. In an exemplary non-limiting example, the distance between attachment points 136 and 138 is a distance comprising the distance of Bragg grating portion 126 plus a distance suitable to accomplish the attachment of optical fiber 128. In an exemplary non-limiting embodiment, torsion adjusting member 132 is sized to fit and rotate within a bore formed in one end of compensating member 134. Torsion member 132 is then rotated until a desired amount of torsion is placed upon optical fiber 128. As can be seen by inspection of FIG. 7, optical fiber 128 is affixed between attachment points 136 and 138 such that optical fiber 128 is not parallel with axis 100.

As will be appreciated by those of ordinary skill in the art, as torsion member 132 is rotated, optical fiber 128 is twisted off-axis in relation to axis 100, thus applying torsion to optical fiber 128. By applying more torsion to optical fiber 128, the period of Bragg grating portion 126 will be increased. Also, the refractive index of Bragg grating portion 126 will be increased. In an exemplary non-limiting embodiment of the present invention, optical fiber 128 is rotated through an angle of about 90°.

Torsion adjusting member 132 is then affixed to compensating member 134 by adhesive means at point 140. In an exemplary non-limiting embodiment, non-permanent adhesive means such as solder are utilized, so that the solder may be re-heated and the torsion may be re-adjusted if necessary. However, any permanent or non-permanent affixing means may be utilized in the present invention. Thermal-compensated Bragg grating filter 120 may also include an enclosure as shown in FIG. 6.

It should be noted from FIG. 7 that attachment point 136 is located on axis 100, and attachment point 138 is located off axis 100. However, other embodiments of the thermal compensated Bragg grating filter of FIG. 7 are readily apparent and should be considered to be within the scope of the present invention. For example, attachment points 136 and 138 may both be off-axis in relation to axis 100. Also, attachment points 136 and 138 may both be disposed on the same side relative to axis 100, or on different sides, or in any relation to axis 100. Finally, attachment point 138 may represent the input or the output of the thermal compensated Bragg grating filter of FIG. 7, as is true of every illustration herein.

As with the previous embodiment, the thermal-compensated Bragg grating filter of the present invention has a linearity of better than 0.02 nm/° C. As will be appreciated by those of ordinary skill in the art, this is a significant improvement in thermal linearity.

Furthermore, as with previous embodiments, the use of axial torsion, rather than axial tension, to facilitate thermal compensation greatly increases the reliability of the present invention over those of the prior art by eliminating tension-induced failures.

Figure 8:
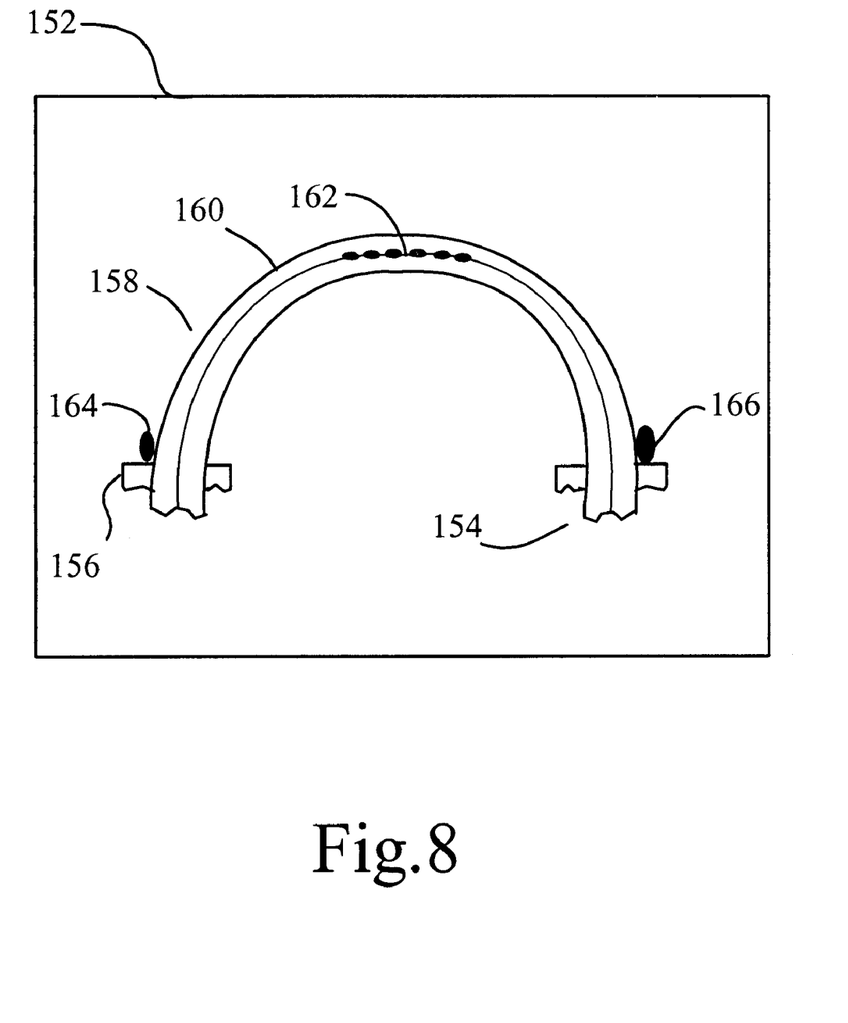
FIG. 8 is a diagram of a third thermal-compensated Bragg grating filter according to the present invention.

Referring now to FIG. 8, a diagram of an embodiment of a thermal-compensated Bragg grating filter according to the present invention is shown. The cross section is taken through the substrate in the region of the optical fiber.

Thermal-compensated Bragg grating filter 150 comprises a optical fiber 154, which further includes an plastic coating 156, a cladded portion 158, and a fiber 160. Optical fiber 154 further includes a Bragg grating portion 162 formed by methods known in the art.

Thermal-compensated Bragg grating filter 150 further includes a compensating member 152. Compensating member 152 is formed from a material having a high thermal expansion coefficient. Preferred materials include aluminum. Optical fiber 154 is bent around a radius and affixed to compensating member 152 at attachment points 164 and 166 using any of the attachment means discussed above, including solder or epoxy. As can be seen by inspection of FIG. 8, optical fiber 154 has the plastic coating 156 removed to facilitate attachment to compensating member 152. In a preferred embodiment, no axial torsion or axial tension is applied to optical fiber 154 prior to bending and attachment to compensating member 152. However, it is contemplated that axial torsion may be applied to optical fiber 154 prior to bending and attachment to compensating member 152. In a preferred embodiment of the present invention, the distance between attachment points 164 and 166 is approximately 10 mm.

As can be seen by inspection if FIG. 8, once optical fiber 154 has been affixed to compensating member 152, attachment points 164 and 166 define the radius of the curve through which optical fiber 154 has been bent. As will be appreciated by those of ordinary skill in the art, bending optical fiber 154 through a curve applies axial torsion to optical fiber 154 and to the Bragg grating portion 162 contained therein. By applying axial torsion to the Bragg grating portion 162, the period of the Bragg grating portion is increased. By reducing the distance between attachment points 164 and 166, the period of the Bragg grating can be further increased. In operation, as the ambient temperature of thermal compensated Bragg grating filter 150 increases, the compensating member 152 will expand thus increasing the distance between attachment points 164 and 166, and the period of the Bragg grating portion 162 will be decreased and thus compensated for accordingly.

As can be seen through the embodiment disclosed in FIG. 8, a method for thermally compensating a Bragg grating filter has been disclosed that does not require the preloading of axial tension or torsion on the optical fiber containing the Bragg grating portion. This can significantly increase the reliability of the Bragg grating filter, since failures due to stresses on the attachment means are greatly reduced when compared to the prior art devices. Furthermore, the embodiment disclosed in FIG. 8 is especially simple in materials and assembly costs when compared to the prior art devices.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A thermal compensated Bragg grating filter comprising:
    a compensating member having an inner surface defining a bore disposed therethrough between a first end and a second end along a longitudinal axis;
    a torsion adjusting member having an inner surface defining a bore disposed therethrough rotatably mounted at said first end of said compensating member about said longitudinal axis;
    an optical fiber having a Bragg grating portion between a first attachment point and a second attachment point;
    said second attachment point of said optical fiber affixed to said inner surface of said compensating member proximate to said second end of said compensating member along said longitudinal axis of said compensating member; and
    said first attachment point of said optical fiber affixed to said inner surface of said torsion adjusting member, said first attachment point being offset from said longitudinal axis.

2. A thermal compensated Bragg grating filter comprising:
    a compensating member having an inner surface defining a bore disposed therethrough between a first end and a second end along a longitudinal axis;
    a torsion adjusting member having an inner surface defining a bore disposed therethrough rotatably mounted at said first end of said compensating member about said longitudinal axis;
    an optical fiber having a Bragg grating portion between a first attachment point and a second attachment point;
    at least one torsion member having third attachment point and a fourth attachment point;
    said second attachment point of said optical fiber and said third attachment point of said at least one torsion member radially disposed about said longitudinal axis of said compensating member and affixed to said inner surface of said compensating member proximate to said second end of said compensating member; and
    said first attachment point of said optical fiber and said fourth attachment point of said at least one torsion member radially disposed about said longitudinal axis of said compensating member and affixed to said inner surface of said torsion adjusting member.

3. The thermal compensated Bragg grating filter of claim 1 or 2, wherein said torsion adjusting member is rotated so as to apply torsion to said Bragg grating portion of said optical fiber.

4. The thermal compensated Bragg grating filter of claim 2, wherein said at least one torsion member is formed from an optical fiber.

5. The thermal compensated Bragg grating filter of claim 2, wherein said at least one torsion member is formed from a plurality of optical fibers.

6. The thermal compensated Bragg grating filter of claim 2, wherein said at least one torsion member is formed from a metallic wire.

7. The thermal compensated Bragg grating filter of claim 1 or 2, wherein said compensating member is formed from Invar.

8. The thermal compensated Bragg grating filter of claim 1 or 2, wherein said torsion adjusting member is formed from aluminum.

9. The thermal compensated Bragg grating filter of claim 1 or 2, wherein said torsion adjusting member is rotated to apply a desired amount of torsion on said Bragg grating portion of said optical fiber, and said torsion adjusting member is then rigidly affixed to said compensating member.

10. The thermal compensated Bragg grating filter of claim 1 or 2, wherein said compensating member is formed from a first material and said torsion adjusting member is formed from a second material.

11. A method for thermally compensating a Bragg grating filter comprising:
    providing an optical fiber having a Bragg grating portion therein;
    providing a compensating member having a desired thermal coefficient of expansion; and
    twisting and mounting said optical fiber in torsional stress to said compensating member.

12. A method for thermally compensating a Bragg grating filter comprising:
    providing an optical fiber having a Bragg grating portion therein;
    providing a compensating member having a desired thermal coefficient of expansion;
    twisting said optical fiber to provide a predetermined amount of torsional stress;
    bending said Bragg grating portion of said optical fiber through a curve; and
    mounting said Bragg grating portion of said optical fiber to said compensating member.

13. A method for thermally compensating a Bragg grating filter comprising:
    providing an optical fiber having a Bragg grating portion therein;
    providing a compensating member having a desired thermal coefficient of expansion;
    twisting said Bragg grating portion of said optical fiber; and
    mounting said Bragg grating portion of said optical fiber to said compensating member.

14. A method for thermally compensating a Bragg grating filter comprising:

providing an optical fiber having a Bragg grating portion therein;

providing a torsion member; to providing a compensating member having a desired thermal coefficient of expansion;

twisting said Bragg grating portion of said optical fiber around said torsion member; and mounting said Bragg grating portion of said optical fiber and said torsion member to said compensating member.

15. A thermal compensated Bragg grating filter comprising:

a compensating member having an inner surface defining a bore disposed therethrough between a first end and a second end along a longitudinal axis;

a torsion adjusting member having an inner surface defining a bore disposed therethrough rotatably mounted at said first end of said compensating member about said longitudinal axis;

an optical fiber having a Bragg grating portion between a first attachment point and a second attachment point;

said second attachment point of said optical fiber affixed to said inner surface of said compensating member proximate to said second end of said compensating member, said second attachment point being offset from said longitudinal axis; and said first attachment point of said optical fiber affixed to said inner surface of said torsion adjusting member, said first attachment point being offset from said longitudinal axis.

* * * * *